(12) United States Patent
Head et al.

(10) Patent No.: US 6,237,274 B1
(45) Date of Patent: May 29, 2001

(54) FISHING ROD HANDLE ATTACHMENT

(76) Inventors: Burton W. Head, 2005 Greencastle Way, Oxnard, CA (US) 93035; L. Mervyn Long, 2383 Mandeville Canyon Rd., Los Angeles, CA (US) 90049

( * ) Notice: Subject to any disclaimer, the term of this patent is extended or adjusted under 35 U.S.C. 154(b) by 199 days.

(21) Appl. No.: 08/600,813

(22) Filed: Feb. 13, 1996

(51) Int. Cl.[7] .......................... A01K 87/08; A01K 87/00
(52) U.S. Cl. ................................................................ 43/25
(58) Field of Search ................................. 43/21.2, 23, 25; 81/489; 16/110.1; 172/13; 30/276

(56) References Cited

U.S. PATENT DOCUMENTS

| | | | |
|---|---|---|---|
| 2,158,104 | * 5/1939 | Bowen | 43/25 |
| 2,653,406 | * 9/1953 | Grabrak | 43/25 |
| 2,761,236 | * 9/1956 | Gaston | 43/25 |
| 3,372,510 | * 3/1968 | Ansenault | 43/25 |
| 4,041,635 | * 8/1977 | Savage | 43/25 |
| 4,825,548 | * 5/1989 | Driggers | 30/276 |
| 5,363,586 | * 11/1994 | Balkenbush | 43/25 |
| 5,426,884 | * 6/1995 | Makowsky | 43/25 |

* cited by examiner

*Primary Examiner*—Kurt Rowan
(74) *Attorney, Agent, or Firm*—Robert E. Malm

(57) ABSTRACT

The fishing rod handle attachment is comprised of a handle, a handle extension for positioning the handle directly above the fishing rod, and an attaching device for rigidly attaching the handle attachment to the fishing rod. The handle is comprised of an elongated member and a support member. The elongated member is gripped by a user's hand while the user is fishing, the elongated member being transverse to the fishing rod, horizontally oriented, and positioned directly above the fishing rod when the fishing rod is being used for fishing. The support member is rigidly attached to the elongated member and provides the means for attaching the elongated member to the handle extension. In some embodiments of the invention, provision is made for adjusting the position of the elongated member relative to the attachment point of the handle attachment to the fishing rod.

1 Claim, 2 Drawing Sheets

FISHING ROD HANDLE ATTACHMENT

BACKGROUND OF THE INVENTION

This invention is related generally to fishing rods used for salt water game fishing and more specifically, to auxiliary fishing rod handles which can provide more effective control of the process of bringing large fish to the boat.

Salt water game fishing encompasses the field of fishing from a boat using a sturdy rod, reel, and line which will stand up to the high loads and stresses involved when "fighting" large and active fish. During the process of bringing the fish to the boat, the angler has to control several forces acting upon the rod. A right-handed angler uses the left hand to control the rod, gripping it ahead of the reel, and the right hand to turn the handle of the reel at the appropriate times when reclaiming the line taken by the hooked fish.

The left hand must use a firm grip to raise and lower the rod under the load to which it is subjected by the fish via the fishing line. Using the correct body posture, a skilled angler can accomplish this, although the position of the left hand may not be optimal. When the right hand begins to turn the handle of the reel, however, the rod becomes subject to another significant force. Because the reel handle is "outboard" (horizontally off center) of the centerline of the rod, a twisting force (torque) is applied to the rod. This torque, alternately clockwise and counterclockwise about the centerline of the rod as the handle of the reel is turned, can be substantial and must be countered by tightening the grip of the left hand on the rod. This rather inefficient way of controlling the rod rotation at best results in discomfort and fatigue as the muscles of the left hand and forearm become tired and at worst results in failure of the grip, thus allowing the rod to rotate.

There is a need for a more effective way of gripping the fishing rod that would avoid the difficulties of controlling rod rotation as the reel handle is turned.

SUMMARY OF THE INVENTION

This invention is a handle attachment for a reel-type fishing rod used for salt water game fishing. The fishing rod handle attachment is comprised of a handle, a handle extension for positioning the handle directly above the fishing rod, and an attaching device for rigidly attaching the handle attachment to the fishing rod.

The handle is comprised of an elongated member and a support member. The elongated member is gripped by a user's hand while the user is fishing, the elongated member being transverse to the fishing rod, horizontally oriented, and positioned directly above the fishing rod when the fishing rod is being used for fishing. The support member is rigidly attached to the elongated member and provides the means for attaching the elongated member to the handle extension. In some embodiments of the invention, provision is made for adjusting the position of the elongated member relative to the attachment point of the handle attachment to the fishing rod.

DESCRIPTION OF THE PREFERRED EMBODIMENTS

The present invention is a fishing rod handle attachment that attaches to a conventional fishing rod and which allows a user to counter the torquing effects on the fishing rod produced by the turning of the handle of the reel. The preferred embodiment of the fishing rod handle attachment 1 is shown attached to a fishing rod 3 in FIG. 1.

Figure 1:
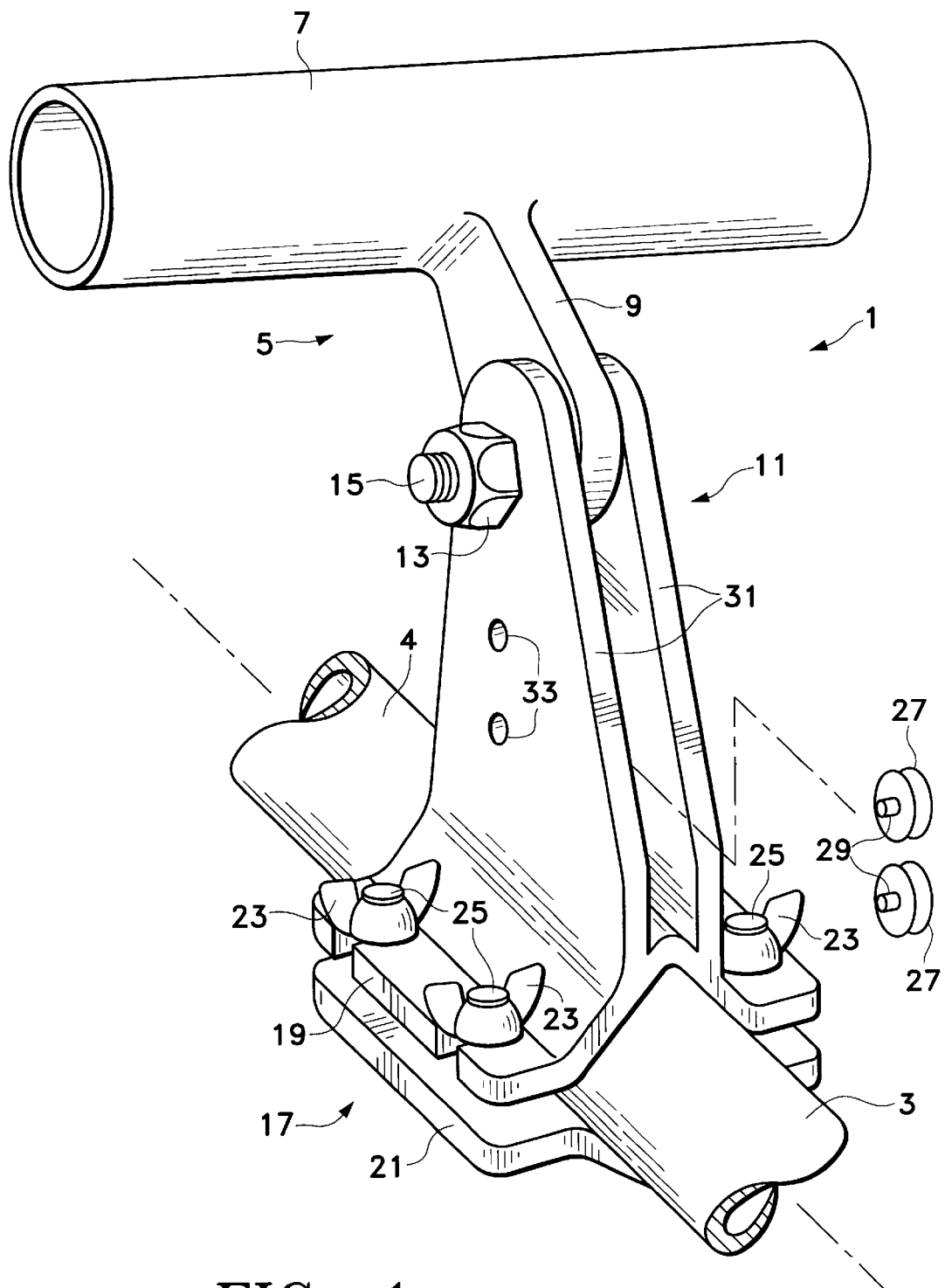
FIG. 1 is a drawing of the preferred embodiment of the fishing rod handle attachment.

The end of the fishing rod away from the user is diagonally downward from the reference number 3 in FIG. 1. The handle-end of the rod is diagonally upward from the reference number 4. The reel is located between the reference number 4 and the handle-end of the rod. The handle attachment 1 is shown in the figure with the fishing rod properly oriented for fishing. In this orientation, the reel (not shown) is located directly above the rod and the axis of rotation of the reel is horizontal.

The handle 5 of the handle attachment 1 is comprised of the elongated member 7 which is gripped by the user's hand when the user is fishing. The elongated member is horizontal and parallel to the axis of rotation of the reel. The handle 5 is also comprised of a support member 9 which is welded to the elongated member 7. The support member 9 is shown in the figure as being attached at the center of the elongated member 7.

The handle 5 is positioned above the fishing rod 3 by the handle extension 11. The handle extension 11 is attached to the support member 9 by the nut 13 and the bolt 15 thereby permitting the handle 5 to be pivotally adjusted in position. To provide even greater adjustment flexibility, the handle extension 11 can be provided with a slot rather than a hole thereby permitting translational adjustments in the position of the handle 5 as well as pivotal adjustments.

The support member 9 is shown in FIG. 1 as being attached at the center of the elongated member 7. To avoid the possible discomfort of a user in having the fingers of his hand straddling the support member 9, the support member 9 can be modified in shape and attached to either end of the elongated member 7. The handle extension 11 can be modified to accommodate this approach as long as the elongated member 7 is maintained in a horizontal orientation directly above the fishing rod as shown in FIG. 1.

The attaching device 17 provides the means for attaching the handle attachment 1 to the fishing rod 3. The attaching device 17 is comprised of two opposing clamping members 19 and 21. Clamping member 19 is welded to the handle extension 11. Clamping member 21 clamps the handle attachment 1 to the fishing rod 3 when attached to clamping member 19 with wing nuts 23 and bolts 25.

The roller guides 27 are grooved rollers which freely rotate on shafts 29. The roller guides 27 are positioned between the two vertical members 31 comprising the handle extension 11. The two vertical members 31 are provided with holes 33 to receive the ends of the shafts 29. The fishing line feeds through the handle extension 11 between the roller guides 27 to the reel. The purpose of the roller guides 27 is to constrain the line as it exits the handle extension 11 to the reel so that the line does not abrade on the edges of the vertical members 31 when it is taken in or paid out.

Figure 2:
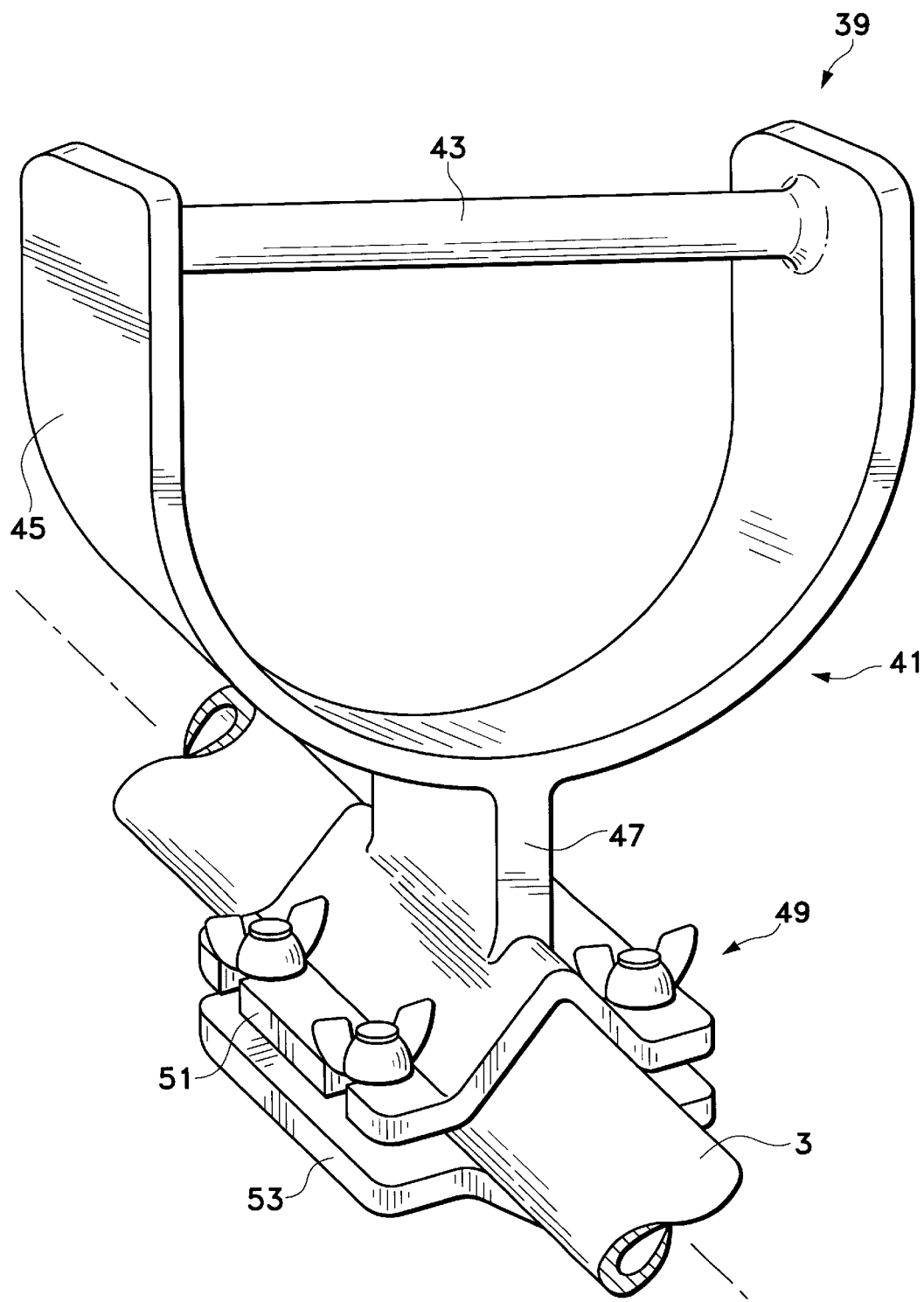
FIG. 2 is a drawing of a second embodiment of the fishing rod handle attachment.

A second embodiment of the fishing rod handle attachment 39 is shown in FIG. 2. The orientation of the fishing rod 3 is the same as in FIG. 1. The handle 41 of the handle attachment 39 is comprised of the elongated member 43 which is gripped by the user when the user is fishing. As before, the elongated member 43 is directly above the fishing rod and horizontally oriented.

The handle 41 is also comprised of a U-shaped support member 45 which is welded to both ends of the elongated member 43. The handle 41 is positioned above the fishing rod by the handle extension 47 which is welded to the support member 41. The handle attachment 39 is attached to the fishing rod 3 by means of attaching device 49 comprised of clamping members 51 and 53. The handle extension 47 is welded to clamping member 51. Attaching device 49 is similar to attaching device 17 shown in FIG. 1.

The fishing rod handle attachment is preferably made of a strong and corrosion-resistant material such as stainless steel. The dimensions of the various parts which comprise the handle attachment are proportioned as shown in the figures with the elongated members 7 and 43 being dimensioned to accommodate a comfortable grip by the user.

What is claimed is:

1. A handle attachment for a reel-type fishing rod comprising:

a handle, the handle being comprised of an elongated member with two ends, the elongated member being gripped by a user's hand while the user is fishing, the elongated member being transverse to the fishing rod, horizontally oriented, and positioned directly above the fishing rod when the fishing rod is being used for fishing;

a handle extension having a first and a second end, the first end being rigidly attached to the handle, the handle extension including roller guides for constraining the transverse movement of the fishing line;

an attaching device for rigidly attaching the handle attachment to the fishing rod, the attaching device being rigidly attached to the second end of the handle extension.

* * * * *